United States Patent [19]

Kimura

[11] Patent Number: 4,507,686
[45] Date of Patent: Mar. 26, 1985

[54] TELEVISION SIGNAL RECORDING AND REPRODUCING APPARATUS

[75] Inventor: Kenji Kimura, Hachioji, Japan

[73] Assignee: Olympus Optical Co., Ltd., Tokyo, Japan

[21] Appl. No.: 581,221

[22] Filed: Feb. 22, 1984

Related U.S. Application Data

[63] Continuation of Ser. No. 416,222, Sep. 9, 1982, abandoned, which is a continuation of Ser. No. 163,404, Jun. 26, 1980, abandoned.

[30] Foreign Application Priority Data

Jun. 26, 1979 [JP] Japan .................................. 54-081221

[51] Int. Cl.$^3$ ............................................. H04N 5/76
[52] U.S. Cl. ..................................... 358/310; 358/906
[58] Field of Search ................. 360/22, 33.1; 358/335, 358/906, 310; 455/348, 349; 369/11, 12

[56] References Cited

U.S. PATENT DOCUMENTS 3,833,758  9/1974  Ferrari ................................ 360/33.1
4,232,329  11/1980  Horak et al. ........................ 360/22

Primary Examiner—Donald McElheny, Jr.
Attorney, Agent, or Firm—Toren, McGeady and Stanger

[57] ABSTRACT

The recording and reproducing apparatus used to record and reproduce image signals includes two units; a recording unit which has the means to record and reproduce the luminance signal component of the image signal by dividing it into a multiple channel conversion signal and the means to record and reproduce the color signal component of the same image signal, and a reproduction signal processing unit which mixes the reproducing luminance signal component and reproducing color signal component from the recording unit and emits reproducing image signals. According to an aspect disclosed these units are constructed so that they can be freely connected to or disconnected from each other.

3 Claims, 1 Drawing Figure

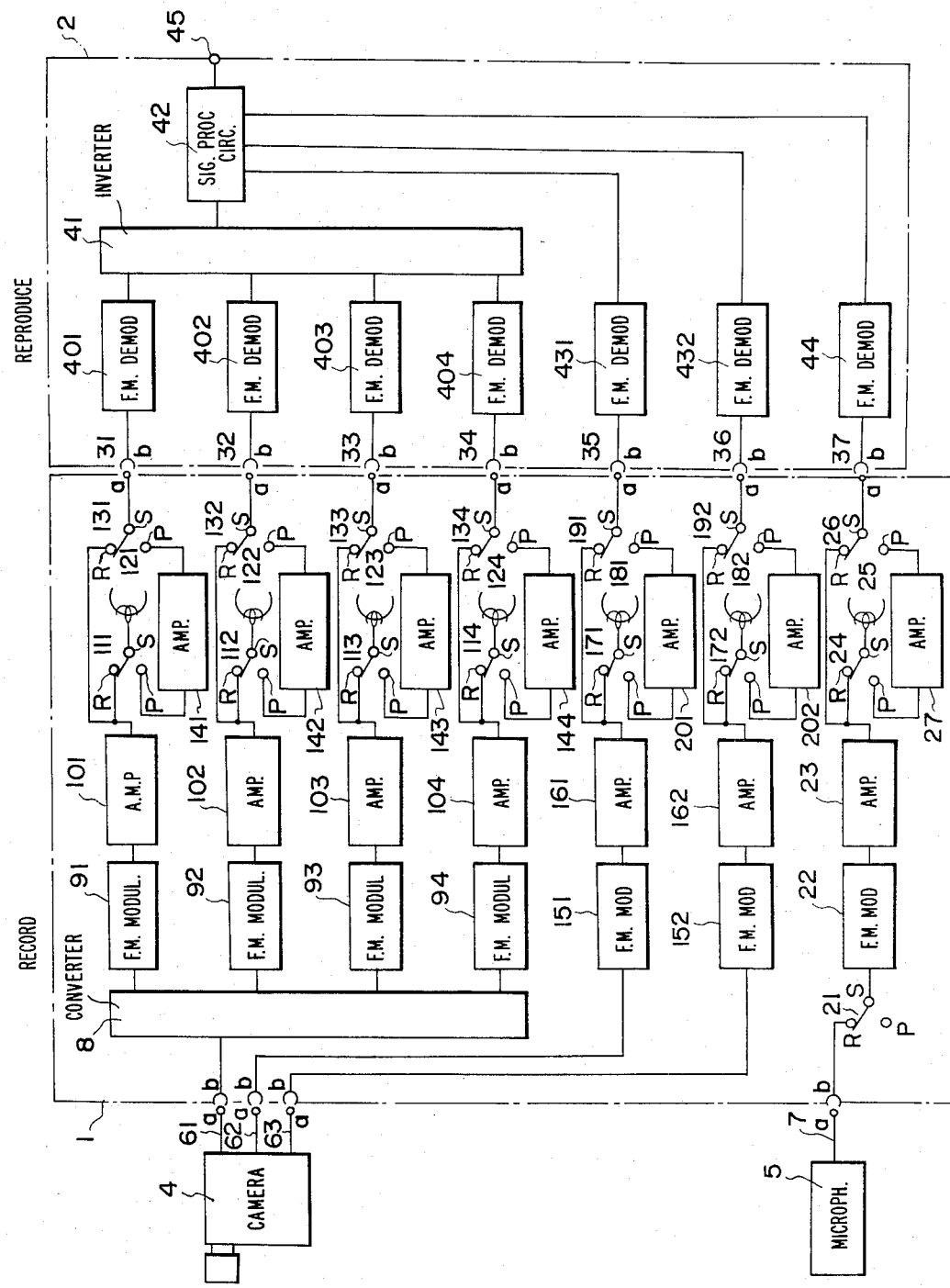

TELEVISION SIGNAL RECORDING AND REPRODUCING APPARATUS

This application is a continuation of application Ser. No. 416,222, filed Sept. 9, 1982, abandoned, which in turn is a continuation of Ser. No. 163,404 filed June 26, 1980, now abandoned.

BACKGROUND OF THE INVENTION

1. Field of the Invention

The present invention belongs to the field of recording/reproducing apparatus and for example, it is related in particular to recording and reproducing apparatus which record and reproduce image signals for television.

2. Description of Prior Art

With this type of recording and reproducing apparatus which has a fixed shape multiple channel head, it is difficult to record the image signals directly because of the limited band in the magnetic exchange section.

Thus, up until now, the image signal was divided into a luminance signal component and a color signal component. The luminance signal component, through a Hadamard transformation or through time sharing was recorded and reproduced as an exchange signal of the multiple channel which has a band limit. The color signal component either underwent low frequency conversion or was recorded and reproduced as a low band color difference signal.

Accordingly, in this kind of apparatus the recording and reproducing of the luminance signal component and the color signal component of the image signal had to be accomplished separately and a recording reproducing section for each of those signals had to be provided. Hence, there was a tendency for the apparatus to be of a large size and to be heavy as well.

SUMMARY OF THE INVENTION

One objective of the present invention is to eliminate the above described defects in the recording and reproducing apparatus.

Another objective of this invention in addition to making the recording unit small and lightweight so that it can be used as a portable image signal recording device, is to offer a recording and reproducing device which stabilizes the reproducing signal and makes possible the monitoring of the recorded contents.

According to the present invention, a recording and reproducing apparatus used to record and reproduce image signals is comprised of two units; a recording unit which has the means to record and reproduce the luminance signal component of the image signal by dividing it into a multiple channel conversion signal and the means to record and reproduce the color signal component of the same image signal, and a reproduction signal processing unit which mixes the reproducing luminance signal component and reproducing color signal component from the recording unit and emits reproducing image signals. Moreover, these units are constructed so that they can be freely connected or disconnected to each other.

The above recording unit is constructed so that televisions, cameras, and microphones can be freely connected or disconnected. Also, the microphone can be built into the television, camera or recording unit.

Furthermore, the unit is made so that the luminance signal component and the color signal component coming from the multiple channel conversion signal which are to be recorded by the above recording unit can be sent directly to the reproduction signal processing unit. And the reproducing signal of the above recording unit is sent through a reproducing primary stage amplifier to the reproduction signal processing unit.

BRIEF DESCRIPTION OF THE DRAWING

The drawing is a block diagram showing an actual example of this invention.

DESCRIPTION OF THE PREFERRED EMBODIMENT

In the drawing, a recording unit 1 records the image signal and a reproduction signal processing unit 2 processes the signal reproduced from recording unit 1. These units 1 and 2 are constructed so that they can be freely connected to or disconnected from each other. When these units 1 and 2 are installed (the diagram illustrates this condition), both are electrically connected by the coupling contact points between them (in the diagram, these are indicated by the numbers 31ab-3-7ab). Also, recording unit 1 is constructed so that a TV (television) camera, for example, color TV 4 camera, and microphone 5 can be freely connected or disconnected. In this case also when TV camera 4 or microphone 5 is installed (the diagram illustrates this condition) they are electrically connected to the recording unit by the coupling contact points 61ab-63ab and 7ab.

The TV camera 4 produces luminance signal component A and color signal components B and C as an image signal and the luminance signal component A is directed to the coupling contact point 61a and the color signal components B and C are directed to the coupling contact points 62a and 63a.

The coupling point 61b in the recording unit 1 is connected to a converter, for example a Hadamard Transformer 8. This converter 8 is formed of a resistance matrix and produces multi-channel (4 channels in the diagram) Hadamard conversion signals.

The output terminal of the Hadamard transformer 8 is connected to the recording amplifiers 101-104 through the FM modulator 91-94. The output terminal of these amplifiers 101-104 are connected to the magnetic heads 120-124 that serve for recording and reproducing through the contact points R-S in the recording position of change-over switches 111-114, and in addition are connected to the coupling contact points 31a-34a through the contact points R-S in the recording position of other change-over switches 131-134. Also, the magnetic head 121-124 is connected to the reproducing primary stage amplifiers 141-144 through the contact points S-P in the reproducing position of the above change-over switches 111-114 and the output terminals of these amplifiers 141-144 are connected the above coupling contact points 31a-34a through the contact points P-S in the reproducing position of the change-over switches 131-134.

Further, the coupling contact points 62b and 63b are connected directly to the FM modulator 151, 152 and the output terminals of these modulators 151 and 152 are connected to the recording amplifiers 161 and 162. The output terminals of the amplifiers 161 and 162 are connected to the magnetic heads 181, 182 used for recording and reproducing through the contact points R-S in the recording position of the change-over switches 171, 172 and in addition, they are connected to the coupling contact points 35a, 36a through the contact points R-S in the recording positions of the other change-over switches 191 and 192. Also, the magnetic heads 181, 182 are connected to the reproducing primary stage amplifiers 201, 202 through the contact points S-P in the reproducing position of the above change-over switches 171, 172 and the output terminals of these amplifiers 201, 202 are connected to the above coupling contact points 35a, 36a through the contact points P-S in the reproducing position of the change-over switches 191, 192.

The coupling contact point connected to microphone 5 is connected to the FM modulator 22 through the contact point R-S in the recording position of the change-over switch 21 and the output terminal of this modulator 22 is connected to the magnetic head 25 for recording and reproducing through the recording amplifier 23 and the contact points R-S in the recording position of the change-over switch 24. In addition the output terminal of the above amplifier 23 is connected to the coupling contact point 37a through the contact point R-S on recording position of the change-over switch 26. The magnetic head 25 is connected to the reproducing primary stage amplifier 27 through the contact points S-P in the reproducing position of the above change-over switch 24 and the output terminal of this amplifier 27 is connected to the above coupling contact point 37a through the contact points P-S in the reproducing position of the above change-over switch 26.

In the reproduction signal processing unit 2, the coupling contact points 31b-34b are connected to the FM demodulators 401-404 and the output terminal of these demodulators 401-404 is connected to a power inverter, in this case a Hadamard power inverter 41. This power inverter 41 are also formed by a resistance matrix and from the output of the above demodulator 401-404 it restores the original luminance signal component A and applies it to the signal processing circuit 42.

The coupling contact points 35b, 36b and 37b are connected to the FM demodulators 431, 432 and 44 so that the demodulated output from these demodulators 431, 432 and 44, in other words the color signal components B and C, and the audio signals are fed to the above signal processing circuit 42.

In this case, the signal processing circuit 42 will, for example, be comprised of a TV signal processing circuit with RF converter, and will perform the functions of mixing the reproducing luminance signal component A with the color signal components B and C and to produce a reproducing image signal containing a voice signal, that is a TV signal, at the output terminal 45.

In operation, when recording only the image signal, the TV camera 4 and the microphone 5 are mounted on the recording unit 1 and the reproducing signal processing unit 2 is disconnected from the recording unit 1.

In this condition, the contact points R-S in the recording position of the change-over switches 111 to 114, 171, 172 and 24 are closed. (The illustration shows this state)

If the luminance signal component A is generated from the TV camera 4, this signal component A is first converted to a 4-channel Hadamard conversion signal by the Hadamard converter 8, then FM modulated by the FM modulators 91 to 94, then amplified by the recording amplifiers 101 to 104, and fed to the magnetic heads 121 to 124 through the contact points R-S in the recording position of the change-over switches 111 to 114, to be recorded on a magnetic tape or the like (not shown in the drawing).

Also the color signal components B and C from the TV camera are first FM modulated by the FM modulators 151 and 152 respectively, then amplified by the recording amplifiers 161 and 162, and fed to the magnetic heads 181 and 182 through the contact points R-S in the recording position of the change-over switches 171 and 172, to be recorded on the aforesaid magnetic tape. In a similar manner, the voice signal from the microphone 5 is FM modulated by the FM modulator 22 through the contact points R-S of the change-over switch 21, then amplified by the recording amplifier 23 and fed to the magnetic head 25 through the contact points R-S in the recording position of the change-over switch 24, to be recorded on the aforesaid magnetic tape.

Therefore, in this fashion, recording of the image signal and voice signal can be accomplished with only the recording unit 1, without the reproducing unit 2. Because of this arrangement, recording unit 1 in particular, can be made small and light-weight and is easily carried as an image is recorded.

Next, in reproducing the content recorded in the recording unit 1, the reproducing signal processing unit 2 is mounted to the recording unit 1 through the coupling contacts 31ab to 37ab. In this case, the TV camera 4 and the microphone 5 may be disconnected from the recording unit 1.

By closing the contacts P-S in the reproducing position of the change-over switches 111 to 114, 131 to 134, 171, 172, 191, 192 24 and 26 in the above condition, the reproducing signals from the magnetic heads 121 to 124 are fed to the demodulators 401 to 404 through the contact points P-S in the reproducing side of the change-over switches 111 to 114, the reproducing primary stage amplifiers 141 to 144 and the contacts P-S in the reproducing position of the change-over switches 131 to 134, then after being modulated, the signals are applied to the Hadamard reversing inverter 41 where the signals are restored to the original luminance signal component A, and applied to the signal processing circuit 42. Also the reproducing signals from the magnetic heads 181 and 182 are fed to the demodulators 431 and 432 through the contact points P-S in the reproducing position of the change-over switches 171 and 172, the reproducing primary stage amplifiers 201 and 202 and the contact points P-S in the reproducing position of the change-over switches 191 and 192, and there, the signals are demodulated to the original color signal components B and C, and applied to the aforementioned signal processing circuit 42. In a similar manner, the reproducing signal from the magnetic head 25 is fed to the demodulator 44 through the contact points P-S in the reproducing position of the change-over switch 24, the reproducing primary stage amplifier 27 and the contact point P-S in the reproducing position of the change-over switch 26 and there, the signal is demodulated and applied to the aforementioned signal processing circuit 42. With this, the luminance signal component A and the color signal components B and C are mixed at the signal processing circuit 42 and the resulting reproducing image signal containing the voice signal, that is, the color TV signal is produced at output terminal 45. Therefore, by connecting the antenna terminals of a TV set which is not shown in the FIGURE, to this output terminal 45, the content recorded in the recording unit 1 can be reproduced on the Braun tube. Of course, the voice can also be reproduced with this TV set.

In this case, the reproducing signals to be reproduced at the aforesaid magnetic heads 121 to 124, 181, 182 and 25 are first applied to the reproducing primary stage amplifiers 141 to 144, 201, 202 and 27 and amplified there for the primary stage, and then fed to the reproducing signal processing unit 2. Thus, the reproducing signal is prevented from becoming unstable by the surrounding conditions immediately after being reproduced at the magnetic heads, and the stable signal can always be forwarded to the reproducing signal processing unit 2.

Next, in monitoring the recorded content in the aforementioned recording condition of the image signal, the reproducing signal processing unit 2 is mounted to the recording unit 1 through the coupling contact points 31ab to 37ab in a manner similar to the aforementioned reproducing case.

By this arrangement, the output of the recording amplifiers 101 to 104 which are fed to the magnetic heads 121 to 124 during the recording cycle are also fed to the demodulators 401 to 404 through the contact points R-S on the recording side of the change-over switches 131 to 134, and demodulated there and then restored to the luminance signal component A through the Hadamard reversing converter 41. Also, the output of the recording amplifiers 161 and 162 which are fed to the magnetic heads 181 and 182 are fed to the demodulators 431 and 432 through the contact points R-S on the recording side of the change-over switches 191 and 192 where the output is restored to the color signal components B and C. In a similar manner, the output of the recording amplifier 23 which is fed to the magnetic head 25 is fed to the demodulator 44 through the contact points R-S on the recording side of the change-over switch 26, where the output is restored to the voice signal. Therefore, in this case also, the luminance signal component A and the color signal components B and C are mixed at the signal processing circuit 42 and the resulting color TV signal containing the voice signal is produced at the output terminal 45 which can be reproduced on the Braun tube of a TV set, which is not shown in the drawing, to monitor the content recorded in the recording unit 1.

Therefore, because of this structure where the recording unit and the reproducing signal processing unit can freely be connected and disconnected, recording of the image signal can be accomplished by the recording unit only. This enables one to make the recording unit small and lightweight and to use the recording unit as a portable image recorder.

Also, the image can always be recorded in the best conditions because the quality of the recording in the recording unit can be monitored by connecting the reproducing signal processing unit to the recording unit. Furthermore, a very fine reproduced image can be obtained because the reproducing signal which is forwarded to the reproducing signal processing unit can always be stabilized.

Further, this invention is not limited to the aforementioned actual example only but can be applied by making variations within a range where the essential points are not changed. For example, the aforementioned example is given for a case where the luminance signal component is converted with 4 channels, but it can be converted in a similar manner with multi channels such as 8, 16, etc. Also the aforementioned actual example is given for a type which uses a Hadamard transformation system, but the invention can also be applied to a type which uses a time sharing system.

Further, in the aforementioned actual example, the output for monitoring the content recorded in the recording unit is obtained from the output of the recording amplifier, but it can also be obtained from the output of the FM modulator at the primary stage of this amplifier. Further, in the aforementioned actual example, the microphone can be freely connected and disconnected to the recording unit, but this microphone can also be built into a TV camera or into a recording unit.

What is claimed is:

1. A video apparatus, comprising:
  (a) a recording unit including:
    (1) first connector means for connection to a camera and receiving luminance signals and color signals,
    (2) converter means coupled to said first connector means for dividing the luminance signal into a plurality of luminance signal components,
    (3) a plurality of first luminance circuit means coupled to said converter for varying each of said luminance signal components,
    (4) a plurality of luminance recording head means coupled to respective ones of said first luminance circuit means for recording each of the varied luminance signal components from said first luminance circuit means,
    (5) a plurality of first color circuit means coupled to said first connector means for varying the color signals,
    (6) a plurality of first color recording head means for recording the varied signals from the first color circuit means, and
    (7) second connector means for carrying the signals appears at said luminance and color recording head means, and
  (b) a playback unit separable from said recording unit and including:
    (1) third connector means coupleable to said second connector means for receiving signals at said second connector means;
    (2) a plurality of second luminance circuit means coupled to said third connector means for operating on luminance signals at said luminance recording heads,
    (3) an inverter coupled to said plurality of second luminance circuit means for combining the signals from said second luminance circuit means,
    (4) a plurality of second color circuit means coupled to said third connector means for varying the signals at said color recording heads, and
    (5) signal processing means coupled to said inverter means and said second color circuit means for producing a video playback signal.

2. A video apparatus as in claim 1, wherein said plurality of first luminance circuit means includes a plurality of modulators for modulating the luminance signal components, said first plurality of color circuit means includes a plurality of modulators for modulating said color signals, said second plurality of luminance circuit means includes a plurality of demodulators for demodulating signals appearing at said luminance recording heads, and wherein said second color circuit means includes a plurality of demodulators for demodulating the signals at said color recording heads.

3. An apparatus as in claim 2, wherein said modulators are FM modulators and wherein said demodulators are FM demodulators.

* * * * *